(12) United States Patent
Sun et al.

(10) Patent No.: US 10,480,961 B2
(45) Date of Patent: Nov. 19, 2019

(54) HYBRID ENCODER SYSTEM FOR POSITION DETERMINATION

(71) Applicant: Rockwell Automation Technologies, Inc., Mayfield Heights, OH (US)

(72) Inventors: Xikai Sun, Shanghai (CN); Peter M. Smit, Mount Sinai, NY (US); Mark R. Cooper, Eden Prairie, MN (US); Oliver C. Haya, Milwaukee, WI (US); Aderiano M. da Silva, Oak Creek, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 59 days.

(21) Appl. No.: 15/911,808

(22) Filed: Mar. 5, 2018

(65) Prior Publication Data

US 2018/0216967 A1    Aug. 2, 2018

Related U.S. Application Data

(63) Continuation-in-part of application No. 15/420,548, filed on Jan. 31, 2017.

(51) Int. Cl.
*G01D 5/20* (2006.01)
*G01D 5/14* (2006.01)

(52) U.S. Cl.
CPC .......... *G01D 5/2046* (2013.01); *G01D 5/145* (2013.01); *G01D 5/2073* (2013.01)

(58) Field of Classification Search
CPC .......... G01D 5/14; G01D 5/20; G01D 5/2006; G01D 5/2013; G01D 5/202; G01D 5/2033;
(Continued)

(56) References Cited

U.S. PATENT DOCUMENTS 2,905,874 A * 9/1959 Kelling ................ G01D 5/2046
318/592
3,178,663 A    4/1965 Kahn
(Continued)

OTHER PUBLICATIONS

X. Ge et al.; "A Novel Variable Reluctance Resolver with Nonoverlapping Tooth-Coil Windings" IEEE Transactions on Energy Conversions 30(2):784-794 (Jun. 2015).
(Continued)

*Primary Examiner* — Steven L Yeninas
(74) *Attorney, Agent, or Firm* — Boyle Fredrickson, S.C.

(57) ABSTRACT

A linear and curvilinear encoder is provided in which absolute mechanical position and high resolution position determination can be obtained using a cart having a mover with "hybrid" teeth, configured in a curvilinear profile or shape, moving along a curvilinear track with a stator having teeth. The absolute mechanical position and high resolution position determination can be detected on the track by applying an excitation signal to a coil surrounding particular teeth of the stator to produce an electromagnetic (EM) field which can be influenced by the profile or shape of the teeth of the mover. A resulting pick-up signal can then be detected in a pick-up coil surrounding particular teeth of the stator with different harmonics in the pick-up signal corresponding to harmonics of the profile or shape of the teeth.

20 Claims, 10 Drawing Sheets

(58) Field of Classification Search
CPC .... G01D 5/204; G01D 5/2046; G01D 5/2066;
G01D 5/2073; G01D 5/208; G01D
5/2086; G01D 5/2093; G01D 5/22; G01D
5/2208; G01D 5/2216; G01D 5/225;
G01D 5/2258; H02K 11/21; H02K
11/215; H02K 11/225
USPC ......... 310/12.15, 12.19, 12.21, 12.22, 12.24,
310/12.25, 12.26, 13; 318/38, 592, 652,
318/653, 661; 324/207.13,
324/207.15–207.19, 207.22, 207.24
See application file for complete search history.

(56) References Cited

U.S. PATENT DOCUMENTS

| | | | | |
|---|---|---|---|---|
| 4,678,971 | A * | 7/1987 | Kanazawa | H02K 41/031 |
| | | | | 310/12.19 |
| 4,700,189 | A | 10/1987 | Welburn | |
| 4,705,971 | A | 11/1987 | Nagasaka | |
| 4,891,590 | A | 1/1990 | Hammel et al. | |
| 5,763,976 | A | 6/1998 | Huard | |
| 6,191,507 | B1 | 2/2001 | Peltier et al. | |
| 6,400,046 | B1 | 6/2002 | Hwang et al. | |
| 6,876,107 | B2 | 4/2005 | Jacobs | |
| 6,998,747 | B2 | 2/2006 | Kujirai et al. | |
| 7,005,771 | B2 | 2/2006 | Kobayashi | |
| 7,030,532 | B2 | 4/2006 | Kobayashi et al. | |
| 7,088,025 | B2 | 8/2006 | Kujirai et al. | |
| 7,157,906 | B2 | 1/2007 | Miya | |
| 8,022,587 | B2 * | 9/2011 | Hoppe | H02K 41/033 |
| | | | | 310/12.18 |
| 8,384,251 | B2 | 2/2013 | Shikayama et al. | |
| 2009/0009010 | A1 * | 1/2009 | Chung | H02K 1/148 |
| | | | | 310/46 |
| 2012/0119730 | A1 * | 5/2012 | Sanchez Exposito | G01D 5/14 |
| | | | | 324/207.25 |
| 2013/0076159 | A1 * | 3/2013 | Chung | H02K 21/16 |
| | | | | 310/12.18 |
| 2013/0328516 | A1 | 12/2013 | Prussmeier et al. | |
| 2015/0048817 | A1 | 2/2015 | Prussmeier | |

OTHER PUBLICATIONS

S. Park et al.; "Study on the Optimal Design of a Novel Slotless Resolver by FEM" IEEE Transactions on Magnetics 50(11) (Nov. 2014).
Saneie et al., "Analytical model for performance prediction of linear resolver"; IET Journals Research Article, IET Electr. Power Appl., 2017, vol. 11 Iss. 8, pp. 1457-1465—(9) pages.
Daniar et al., "Position error calculation of linear resolver under mechanical fault conditions"; IET Journals Research Article, IET Science, Measurement & Technology, 2017, vol. 11 Iss, 7, pp. 948-954—(7 pages).
Saneie et al., "The influence of Winding Pole Pairs on Position Error of Linear Resolver"; 25th Iranian Conference on Electrical Engineering (ICEE2017) pp. 949-954—(6 pages).
Z. Nasiri-Gheidari, "Design, Performance Analysis, and Prototyping of Linear Resolvers"; 0885-8969 (c) 2017 IEEE. Personal use is permitted, but republication/redistribution requires IEEE permission, See http://www.ieee.org/publications_standards/publications/rights/index.html for more information—(10 pages).
Gheidari et al., "An optimized axial flux variable reluctance resolver with concentric windings"; 2016 24th Iranian Conference on Electrical Engineering (ICEE) pp. 1284-1290—(7 pages).
Sarabi et al., "Analysis of Winding Configurations and Slot-Pole Combinations in Fractional-Slots Resolvers"; 1530-437X (c) 2016 IEEE. Personal use is permitted, but republication/redistribution requires IEEE permission. See http://www.ieee.org/publications_standards/publications/rights/index.html for more information—(9 pages).
Gheidari et al., "Axial Flux Resolver Design Techniques for Minimizing Position Error Due to Static Eccentricities"; 1530-437X (c) 2015 IEEE. Personal use is permitted, but republication/redistribution requires IEEE permission. See http://www.ieee.org/publications_standards/publications/rights/index.htm; for more information—(8 pages).
Gheidari et al., "Design oriented technique for mitigating position error due to shaft run-out in sinusoidal-rotor variable reluctance resolvers"; IET Journals Research Article, IET Electr. Power Appl., 2017, vol. 11, Iss. 1, pp. 132-141—(10 pages).
Zahra Nasiri-Gheidari, "Design, Analysis, and Prototyping of a New Wound-Rotor Axial Flux Brushless Resolver" IEEE Transactions on Energy Conversion, vol. 32, No. 1, Mar. 2017—(8 pages).
Gheidari et al., "Design-Oriented Modelling of Axial-flux Variable-reluctance Resolver Based on Magnetic Equivalent Circuits and Schwarz-Christoffel Mapping"; 0278-0046 (c) 2017 IEEE. Personal use is permitted, but republication/redistribution requires IEEE permission. See http://www.ieee.org/publications_standards/publications/rights/index.html for more information—(9 pages).
Sarabi et al., "Performance Analysis of Concentrated Wound-Rotor Resolver for Its Applications in High Pole Number Permanent Magnet Motors"; IEEE Sensors Journal, vol. 17, No. 23, Dec. 1, 2017; 1558-1748 © 2017 IEEE, Personal use is permitted, but republication/redistribution requires IEEE permission. See http://www.ieee.org/publications_standards/publications/rights/index.html for more information—(9 pages).
Tootoonchian et al., "Twelve-slot two saliency variable reluctance resolver with non-overlapping signal windings and axial flux excitation"; IET Journal Research Article; IET Electr. Power Appl., 2017, vol. 11, Iss. 1, pp. 49-62—(14 pages.
Ge et al., "A Novel Design of Rotor Contour for Variable Reluctance Resolver by Injecting Auxiliary Air-Gap Permeance Harmonics"; IEEE Transactions on Energy Conversion; 0885-8969 © 2015 IEEE. Personal use is permitted, but republication/redistribution requires IEEE permission. See http://www.ieee.org/publications standards/publications/rights/index.html for more information—(9 pages).
Qihui Zhou. "A new structure of VR two-speed resolver", Small & Special Electrical Machines, vol. 30, No, 4, pp. 17-18, 2002—(2) pages.

* cited by examiner

HYBRID ENCODER SYSTEM FOR POSITION DETERMINATION

CROSS-REFERENCE TO RELATED APPLICATION(S)

This application is a continuation in part of U.S. patent application Ser. No. 15/420,548, filed on Jan. 31, 2017, entitled "Curvilinear Encoder System for Position Determination," the entirety of which is incorporated herein by reference.

FIELD OF THE INVENTION

The subject matter disclosed herein relates generally to industrial control systems, and more particularly, to a linear and curvilinear encoder system for determining a position of a cart for moving objects along a track.

BACKGROUND OF THE INVENTION

In industrial control systems, it is often desirable to move objects from one location to another for accomplishing various tasks. For example, rolling conveyors are often used to move objects from one location to another for interacting with different machines of an industrial control process, such as a first machine at a first location for placing a box, a second machine at a second location for filling the box, and a third machine at a third location for closing the box.

More recently, a track system has been developed in which multiple "carts" can be independently driven along a "track" for accomplishing the various tasks of the industrial control process. By providing independently controllable carts, the timing of each task can be more precisely controlled than traditional systems such as rolling conveyors.

In such track systems having moving carts, it is often desirable to know the position of each cart at all times to ensure that the industrial control process is executing correctly. To accomplish this, each cart can be configured with a magnetic encoder scale, and the track can be configured with arrays of magnetic sensors with an air gap between the magnetic encoder scale and the magnetic sensors. In operation, when a magnetic encoder scale on a moving cart is near a group of magnetic sensors on the track, the magnetic sensors can determine the absolute position of the cart by measuring the varying magnetic field strength or varying magnetic field angle from the magnetic encoder scale on the cart. Conversely, when the cart is away from the group of magnetic sensors on the track, the magnetic sensors no longer sense the position magnet of the cart and, in turn, no longer generate output signals having measurable amplitudes. Accordingly, the magnetic sensors can be used to determine absolute positions of carts on the track. This is sometimes referred to as an encoder system.

However, encoder systems using magnetic sensors typically require calibration in the system in order to be effective. In addition, such magnetic sensors are typically sensitive to temperature variations that change sensor sensitivity and therefore measurement accuracy. Consequently, a need exists to provide a system for monitoring positions of carts on a track that eliminates one or more of the foregoing disadvantages.

SUMMARY OF THE INVENTION

The present invention provides a linear and curvilinear encoder in which an incremental or absolute position for a cart can be detected on a track by applying one or more excitation signals and receiving one or more pick up signals. Analogous to a transformer arrangement, an encoder mover can be placed on the cart moving along the track, and an encoder stator can be placed on the track separated by a gap. The one or more excitation signals can be applied to the one or more excitation coils on the mover or the stator to generate one or more magnetic fields, and the one or more pick up signals can be received by one or more pick up coils on the mover or the stator for sensing changes in the magnetic fields produced by motion of the mover on the track.

In one aspect, a "wound mover" may be provided in which the mover can include one or more of the aforementioned coils. With a wound mover, the stator can provide any coils not provided by the mover for operation. In another aspect, a "reluctance mover" may be provided in which a simplified mover does not provide any coils. With a reluctance mover, the stator includes the aforementioned coils for operation. As a result, position for carts can be monitored along tracks having varying geometries, including tracks having linear and curvilinear sections, without the need for calibration of magnetic sensor's or the adverse effects of temperature variations.

The mover and the stator can preferably be manufactured from a ferrous or other material having magnetic properties. For smaller air gaps, the mover and the stator can be manufactured from any suitable material which need not have magnetic properties. The ferrous structure attached to the mover can have equal spaced poles or teeth, and the ferrous structures attached to the track can have equal spaced poles or teeth but with a different pitch as mover. The mover and the stator can each have substantially rectangular straight toothed edged surfaces (such that each tooth can potentially provide a magnetic pole pair in various configurations when wound by a coil), or the stator or the mover can have rounded or sloping edges for improving various properties as may be desired, such as sinusoidal teeth for improved EM properties with minimized distortion.

The aforementioned coils can be implemented on the mover or the stator by wrapping continuous conductors in coils around teeth of the mover or stator in varying configurations and patterns. In a preferred aspect, the toothed surfaces of the mover or the stator can be placed through holes in multilayer Printed Circuit Boards (PCB's) so that copper traces can be routed on the boards, connected by vias, to form the coils surrounding the teeth. For the stator, multiple circuit boards can be arranged serially, one after another, for completing the stator along a track.

One or more excitation signals can be provided to the one or more coils by way of Alternating Current (AC) waveforms. The AC waveforms may be sinusoidal or square waveforms having a common frequency such as 4 kHz, 7 kHz or 10 kHz. In one aspect, two excitation signals can be provided to two coils, respectively, with each of the coils being wound around teeth in different ways to generate different pole-pairs for electromagnetic fields in the air gap. This can allow production of "coarse" with lesser pole-pairs and "fine" with greater pole-pairs magnetic fields for absolute position sensing. The pole pitch for coarse winding is usually larger than fine winding, but they may have the same winding configuration.

In addition, one or more pick up signals can be received by coils sensing changes in the magnetic fields caused by travel of the encoder movers on the carts along the track. Preferably, two pick up signals provided by two coils that are offset from one another allow better resolution and determination of direction. More preferably, the two pick up signals provided by the two coils can be offset by 90° so that one signal can provide a sine measurement and the other signal can provide a cosine measurement for mathematically determining a position. Alternatively, the two pick up signals provided by the two coils can be offset by 120° for mathematically determining the absolute position. Even more preferably, four pick up signals can be provided by four coils in which two pick up signals/coils with a certain number of pole pairs may provide "coarse" position sensing with respect to the coarse magnetic field (sine 1 and cosine 1) and two pick up signals/coils with another number of pole pairs may provide "fine" position sensing with respect to the fine magnetic field (sine 2 and cosine 2). Having four pick up signals, a sine and cosine pair for coarse position sensing, and another sine and cosine pair for fine position sensing, can be referred to as a "multi-speed" system, which can have the added benefit of improved "absolute position" determination for carts along the track.

Specifically then, one aspect of the present invention may provide an industrial control system for moving objects including: a track having curved and linear sections; a stator disposed along the track, the stator having multiple teeth; a cart for moving objects along the track, the cart having a mover portion having multiple teeth in which the teeth of the mover portion are arranged to face the teeth of the stator across a gap; an excitation coil surrounding teeth of the stator or the mover portion; and a pick-up coil surrounding teeth of the stator or the mover portion. An excitation signal provided to the excitation coil is operable to produce an electromagnetic (EM) field. The EM field can then induce a pick-up signal in the pick-up coil for determining a position of the mover portion with respect to the stator.

Another aspect of the present invention may provide a method for moving objects in an industrial control system, the method including: providing a track having curved and linear sections; disposing a stator along the track, the stator having multiple teeth; configuring a cart for moving objects along the track, the cart having a mover portion having multiple teeth in which the teeth of the mover portion are arranged to face the teeth of the stator across a gap; surrounding teeth of the stator or the mover portion with an excitation coil; surrounding teeth of the stator or the mover portion with a pick-up coil; providing an excitation signal to the excitation coil to produce an electromagnetic (EM) field; and determining a position of the mover portion with respect to the stator from a pick-up signal induced in the pick-up coil by the EM field.

The present inventors have further determined that the aforementioned curvilinear encoder system can be improved to provide absolute mechanical position determination and high resolution position determination with fewer coils and reduced hardware by configuring the teeth of the mover to have a curvilinear profile with first and second harmonics while providing coils on only teeth of the stator. The curvilinear shape of the teeth of the mover can allow a single excitation coil on the stator to produce a pick-up signal with different harmonics in pick-up coil on the stator instead of requiring multiple excitation coils to produce multiple pick-up signals multiple in pick-up coils to convey the same information.

In one aspect, the present invention provides an integrated hybrid-pole reluctance resolver with absolute mechanical position detection, high resolution and mechanical position identification with reduced system cost. The present invention provides an independent cart system with position feedback, temperature stability and air gap insensitivity. The cart can be configured for travel along linear and/or curved sections of modular track systems.

With a hybrid-pole, the rotor/mover can have two working pole pairs. There can be two main harmonics in an air gap electromagnetic motive force, and two main harmonic outputs in stator pick up coils. One harmonic with more pole pairs can achieve higher resolution; and another harmonic with less pole pairs can calculate a mechanical position. To identify the absolute mechanical position, the first pole pair and the second pole pair may have no common divisor other than 1.

In the system, an air gap length ("$\delta$") between the stator (on the track) and the mover can meet the following equation, where $\delta_{min}$ is a minimum air gap length; "$P_{p1}$" and "$P_{p2}$" are two working pole pairs, "$A_1$" is a magnitude for a harmonic with pole pair "$P_{p1}$". "$\theta$" is a mechanical angle; and "K" is a coefficient for a harmonic with pole pair "$P_{p2}$":

$$\delta = \frac{K\delta_{min}}{1 + (K-1)\cos(P_{p2}\theta) - A_1 \cos(P_{p1}\theta)}$$

Accordingly, with hybrid poles, only one resolver system (rather than two) can more efficiently identify an absolute mechanical position with high accuracy, saving half the system cost.

Accordingly, another aspect of the present invention may provide an industrial control system for moving objects, including: a track having curved and linear sections; a stator disposed along the track, the stator having multiple teeth; a cart for moving objects along the track, the cart having a mover portion having multiple teeth, in which the teeth of the mover portion are arranged to face the teeth of the stator across a gap, and in which the teeth of the mover portion have a curvilinear profile with first and second harmonics; an excitation coil surrounding teeth of the stator, in which an excitation signal provided to the excitation coil is operable to produce an electromagnetic (EM) field; and a pick-up coil surrounding teeth of the stator, in which presence of the cart in the EM field induces a pick-up signal in the pick-up coil with first and second harmonics caused by the first and second harmonics of the curvilinear profile of the teeth of the mover portion in the EM field for determining a fine position of the mover portion with respect to the stator from the first harmonic and a coarse position of the mover portion with respect to the stator from the second harmonic.

The first and second harmonics of the curvilinear profile of the teeth of the mover portion can provide magnetic pole pairs. For example, the first harmonic of the curvilinear profile of the teeth of the mover portion can provide at least five magnetic pole pairs for inducing the second harmonic in the pickup signal being at least a fifth order harmonic and the second harmonic of the curvilinear profile of the teeth of the mover portion can provide one magnetic pole pair for inducing the first harmonic in the pick-up signal being a first order harmonic. The coarse position can provide an absolute mechanical position of the mover portion with respect to the stator in a section of the track with lower resolution. The fine position can provide a higher resolution, though non-absolute, mechanical position of the mover portion with respect to the stator in the section of the track.

A controller can receive the pick-up signal. The controller can then execute a fast Fourier transform (FFT) of the pick-up signal to derive the first and second harmonics. The teeth of the stator can have a rectangular profile. The pick-up coil can be a first pick-up coil and the pick-up signal can be a first pick-up signal, and a second pick-up coil can surround teeth of the stator. The EM field can induce a second pick-up signal in the second pick-up coil with the first and second harmonics for determining the coarse and fine positions. The first and second pick-up signals can provide sine and cosine measurements, respectively. Each section of the track can provide an output to a controller for determining the coarse and fine positions and a direction of the mover portion with respect to the stator in a section of the track.

Another aspect of the present invention may provide a method for moving objects in an industrial control system, including: providing a track having curved and linear sections; providing a stator along the track, the stator having multiple teeth; providing a cart for moving objects along the track, the cart having a mover portion having multiple teeth, in which the teeth of the mover portion are arranged to face the teeth of the stator across a gap, and in which the teeth of the mover portion have a curvilinear profile with first and second harmonics; providing an excitation signal to an excitation coil surrounding teeth of the stator to produce an electromagnetic (EM) field; detecting a pick-up signal in a pick-up coil surrounding teeth of the stator, in which presence of the cart in the EM field induces first and second harmonics in the pick-up signal caused by the first and second harmonics of the curvilinear profile of the teeth of the mover portion in the EM field; and determining a fine position of the mover portion with respect to the stator from the first harmonic and a coarse position of the mover portion with respect to the stator from the second harmonic.

These and other objects, advantages and aspects of the invention will become apparent from the following description. The particular objects and advantages described herein can apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE OF THE INVENTION

Figure 1:
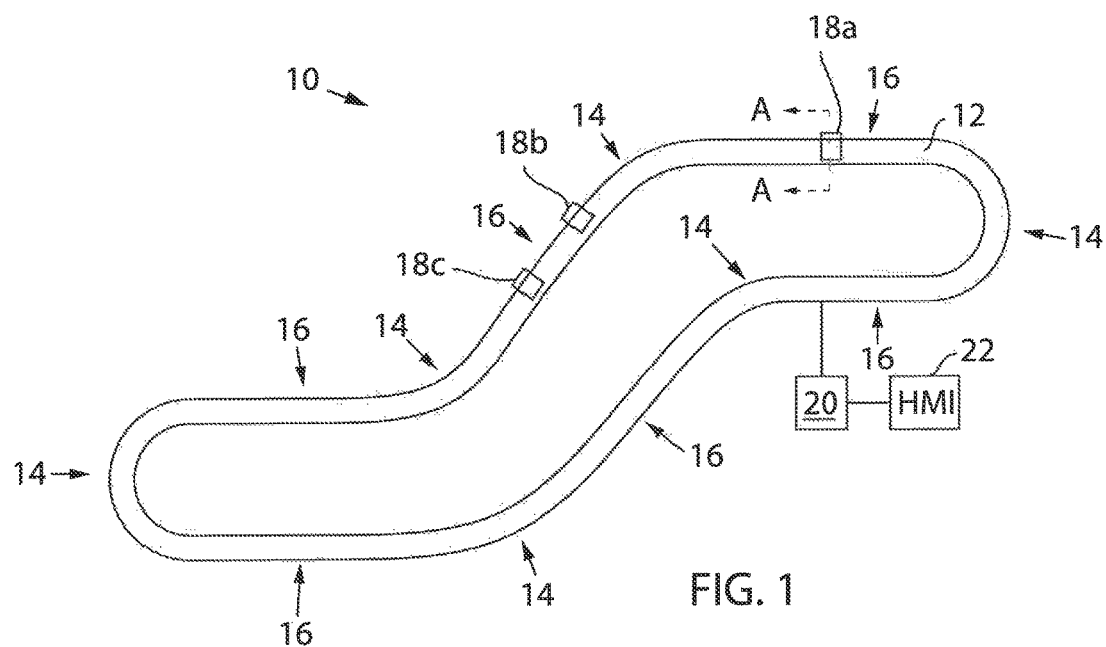
FIG. 1 is an exemplar industrial control system including a track having curved and linear sections and multiple carts for moving objects along the track in accordance with an aspect of the invention.

Referring now to FIG. 1, in accordance with an aspect of the invention, an exemplar industrial control system 10 includes a track 12 having curved sections 14 and linear sections 16. Multiple carts 18, such as carts 18a, 18b and 18c, can be provided for moving objects along the track 12 from one location to another for accomplishing various tasks in the industrial control system 10. The track 12 can be connected to a controller 20, which can include a processor executing a program stored in a non-transient medium, and which can communicate with a Human Machine Interface ("HMI") 22 for providing I/O, for carrying out various aspects of the invention as will be described herein. It will be appreciated that the track 12, being flexibly capable of curved and linear sections according to various geometries, can be configured to implement a wide variety of paths and orientations as may be required in the environment.

Figure 2:
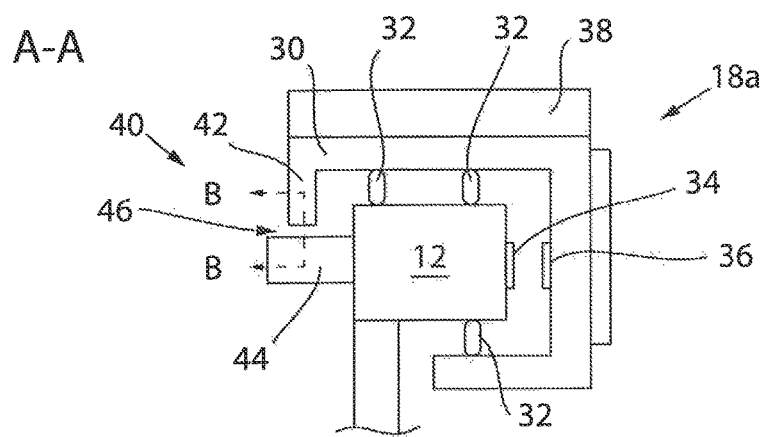
FIG. 2 is a cross sectional view of a cart along the track taken along line A-A of FIG. 1.

With additional reference to FIG. 2, a cross sectional view of a cart 16 along the track 12, such as the cart 18a, taken along line A-A of FIG. 1, illustrates certain aspects of the system. The cart 18 can include a frame 30, which may be aluminum, supporting one or more rollers 32 in communication with the track 12 for moving the cart 18 along the track 12. To move the cart 18, a power winding 34 disposed along on the track 12 can be selectively energized to electromagnetically react with a power magnet 36 affixed to the cart 18 to thereby move the cart 18. The cart 18 can include a work area 38 which can be used to accomplish various industrial control functions for moving objects. For determining a position of the cart 18 along the track 12, the system can implement a curvilinear encoder system 40 including a mover portion 42 disposed by the cart 18 and a stator 44 disposed along the track 12. The mover portion 42 can be arranged to continuously face the stator 44 across a gap 46, which is preferably an air gap, as the cart 18 moves along the track 12.

Figure 3:
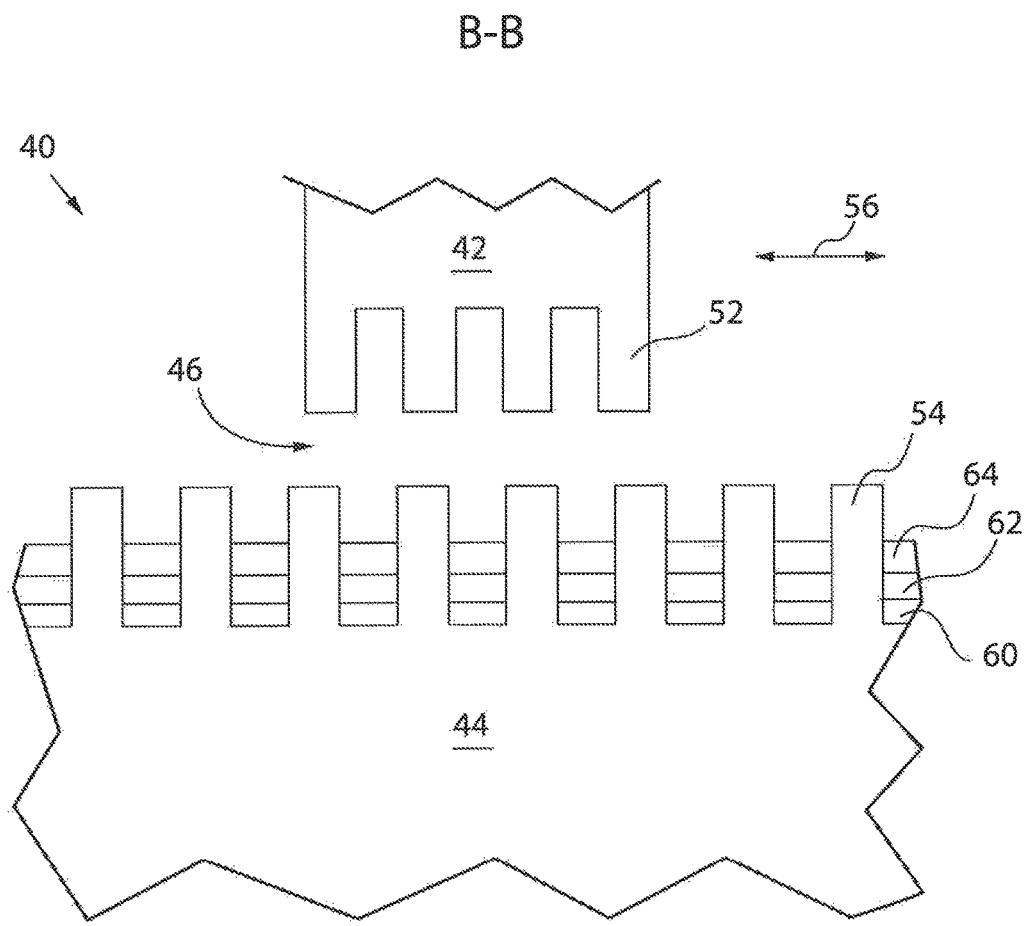
FIG. 3 is a cross sectional view of a stator disposed along the track and a mover portion of the cart according to a first aspect, taken along line B-B of FIG. 2.

With additional reference to FIG. 3, a cross sectional view of the mover portion 42 facing the stator 44 across the gap 46, taken along line B-B of FIG. 2, is provided according to a first aspect of the invention. The mover portion 42 and/or the stator 44 can be manufactured from a ferrous or other material having magnetic properties. The mover portion 42 can have multiple teeth 52, and the stator 44 can have multiple teeth 54, with the teeth 52 of the mover portion 42 being arranged to face the teeth 54 of the stator 44. As used herein, "teeth" can include any formations which may be provided by the mover portion 42 or the stator 44 for electromagnetically communicating across the gap 46. The teeth can be, for example, equal spaced ridged formations formed between grooves or slots. Moreover, the teeth 52 of the mover portion 42 can have the same dimensions/pitch as the teeth 54 of the stator 44, with the stator 44 typically having substantially more teeth than the mover portion 42. In one aspect, the ridged formations can comprise substantially rectangular straight toothed edged surfaces, projecting outwardly, such as by about 4 mm, with separations between ridged formations across slots, such as by about 4 mm, such as teeth having a rectangular profile. In another aspect, the ridged formations can have more rounded or sloping edges for improving various properties as may be desired, such as teeth having a sinusoidal profile for improved EM properties with minimized distortion (see FIG. 4). Accordingly, teeth of the mover portion 42 and/or the stator 44 can potentially form magnetic pole pairs (North and South pairs) in various configurations when wound by electrically conducting coils.

The curvilinear encoder system 40 can include one or more electrically conducting excitation coils surrounding (wound around) teeth of the mover portion 42 and/or the stator 44. The curvilinear encoder system 40 can also include one or more electrically conducting pick-up coils surrounding (wound around) teeth of the mover portion 42 and/or the stator 44. In operation, one or more excitation signals can be provided to the one or more excitation coils to produce one or more electromagnetic (EM) fields. The one or more EM fields, in turn, can induce one or more pick-up signals in the one or more pick-up coils for determining a position of the mover portion 42 with respect to the stator 44. In addition, the one or more pick-up signals can be used for determining a direction of travel for the mover portion 42 with respect to the stator 44. The excitation and/or pick-up coils can be implemented by layers of one or more Printed Circuit Boards (PCB's) in which teeth are disposed through holes in the PCB's so that copper traces of the PCB's, connected between layers by vias, can provide the windings surrounding the teeth in clockwise or counter-clockwise directions.

In the first aspect of the invention as shown in FIG. 3, the curvilinear encoder system 40 can operate with the mover portion 42 being a "reluctance mover" in which the excitation and pick-up coils surround teeth of only the stator 44 without any coils surrounding teeth of the mover portion 42. By way of example, a first PCB 60 can provide an excitation coil with respect to the stator 44 by forming windings around teeth of the stator 44 in multiple layers of the first PCB 60. A second PCB 62, disposed over the first PCB 60, can provide a first pick-up coil with respect to the stator 44 by forming windings around teeth of the stator 44 in multiple layers of the second PCB 62. A third PCB 64, disposed over the second PCB 62, can provide a second pick-up coil with respect to the stator 44 by forming windings around teeth of the stator 44 in multiple layers of the second PCB 62. Accordingly, the mover portion 42 can be free of any coils, thereby simplified. The stator 44 can provide an excitation signal to the excitation coil in the first PCB 60 to produce an EM field. The EM field, in turn, can induce first and second pick-up signals in the first and second pick-up coils of the second and third PCB's 62 and 64, respectively. However, the EM field, and therefore the first and second pick-up signals induced in the first and second pick-up coils, will change as the mover portion 42 moves in proximity to particular locations of the track 12.

In addition, windings of the first and second pick-up coils can be offset by 90°, so that the EM field can induce the first and second pick-up signals to be correspondingly offset, so that the first and second pick-up signals can provide sine and cosine measurements, respectively. Alternatively, the first and second pick-up coils can be offset by another phase, such as 120°. With the first and second pick-up signals induced, and the sine and cosine measurements determined, respectively, a position of the mover portion 42 with respect to the stator 44 can be determined. In addition, the first and second pick-up signals can be compared to determine a direction of travel 56 for the mover portion 42 with respect to the stator 44.

In a trade-off between achieving high resolution for position determination and achieving high accuracy for detection of pick-up signals, the first and second pick-up coils can be configured to provide varying numbers of magnetic poles (North and South pairs). A magnetic pole can be formed by winding a coil to surround a first tooth in a first direction, such as clockwise, thereby forming a North side, then winding the coil to surround a second tooth, adjacent to the first tooth, in a second direction that is alternate to the first direction, such as counter-clockwise, thereby forming a South side (one North and South pair). The first and second pick-up coils can be repeated in sections (see also FIG. 7) along the track 12, and in each section, the windings of the coils can be repeated to consistently implement the desired number of magnetic poles. In a system targeting higher resolution for position determination, a greater number of magnetic poles can be provided in each section (such as 4 pole pairs). This can advantageously provide higher frequencies for analyzing signals. However, in a system targeting higher accuracy for detection of pick-up signals, a lesser number of magnetic poles can be provided in each section (such as 1 pole pair). This can advantageously provide higher amplitudes for detecting signals.

Figure 4:
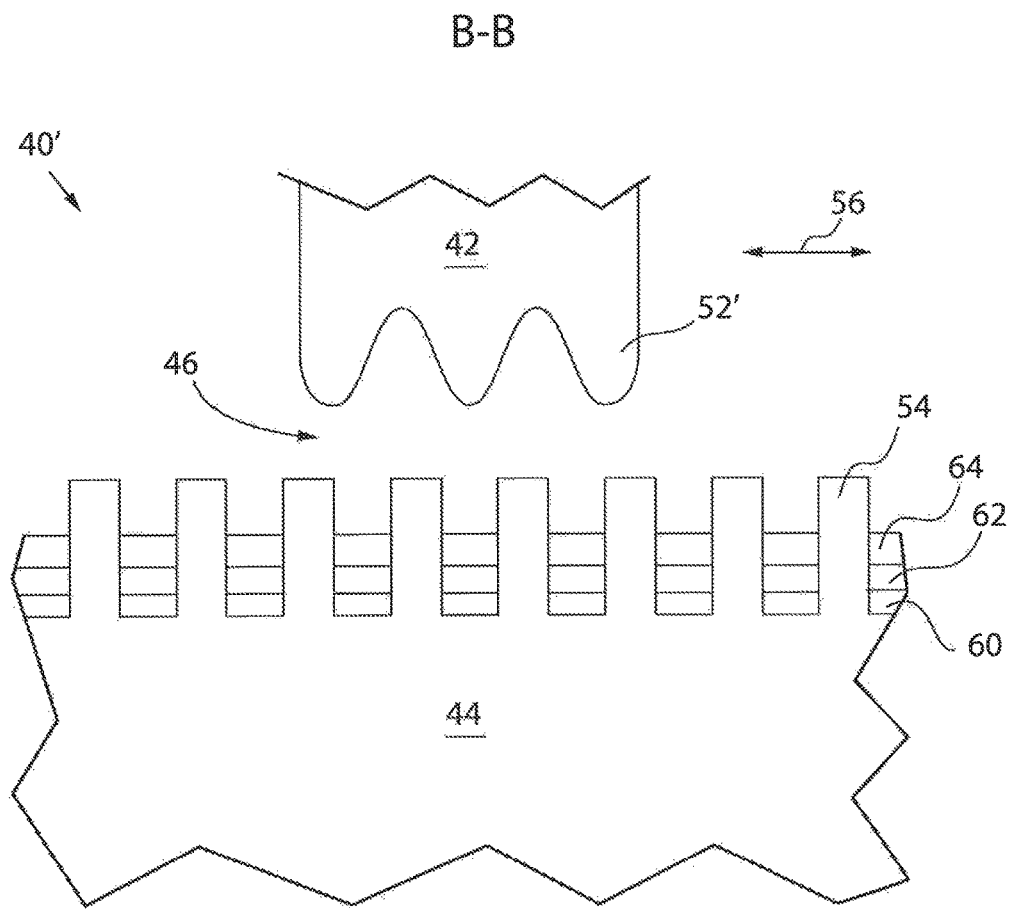
FIG. 4 is a cross sectional view of a stator disposed along the track and a mover portion of the cart according to a second aspect, taken along line B-B of FIG. 2.

Referring now to FIG. 4, a cross sectional view of the mover portion 42 facing the stator 44 across the gap 46, taken along line B-B of FIG. 2, is provided according to a second aspect of the invention where like numerals refer to like parts throughout. Here, the curvilinear encoder system 40' can operate with the mover portion 42 being a "reluctance mover" in which the excitation and pick-up coils surround teeth of only the stator 44 without any coils surrounding teeth of the mover portion 42 similar to the aspect described above with respect to FIG. 3. However, teeth 52' of the mover portion 42 can have a sinusoidal profile for improved EM properties with minimized distortion. Accordingly, the teeth 52' can have shaped poles which can be operable to reduce pick-up signal harmonics.

Figure 5:
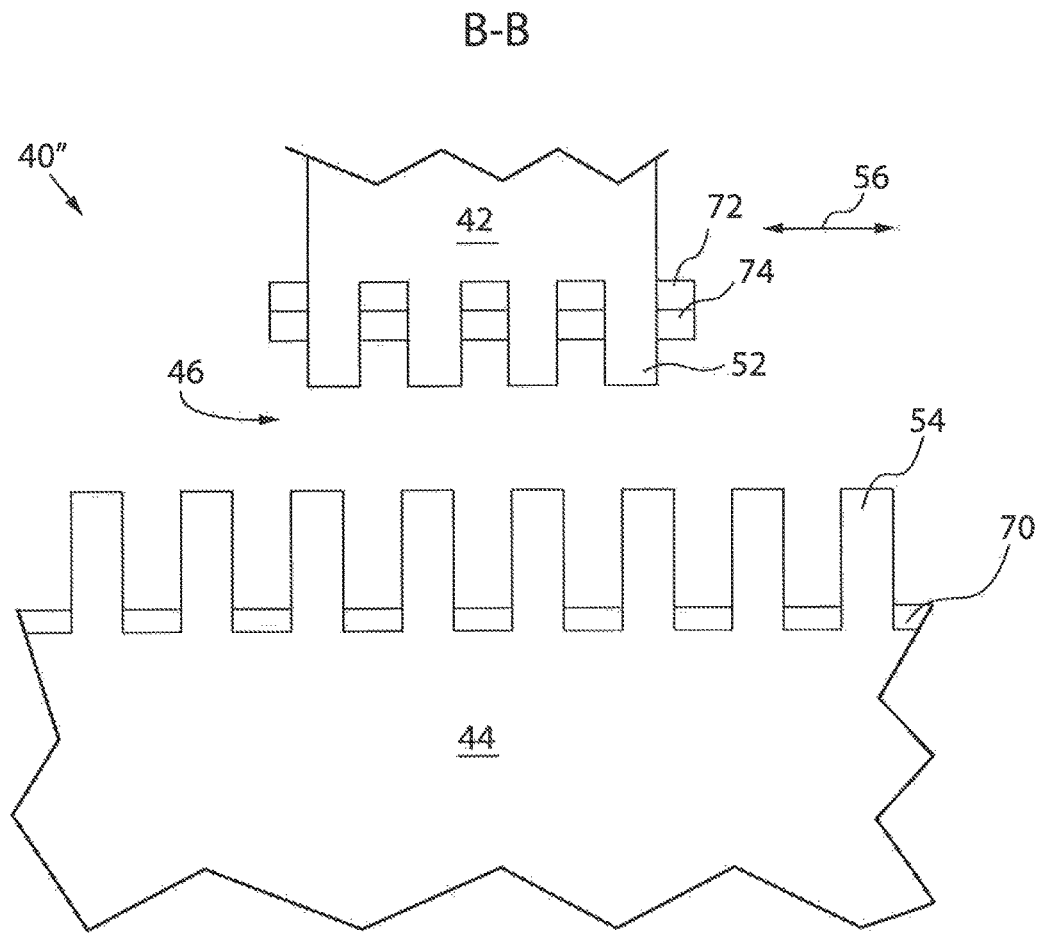
FIG. 5 is a cross sectional view of a stator disposed along the track and a mover portion of the cart according to a third aspect, taken along line B-B of FIG. 2.

Referring now to FIG. 5, a cross sectional view of the mover portion 42 facing the stator 44 across the gap 46, taken along line B-B of FIG. 2, is provided according to a third aspect of the invention where like numerals refer to like parts throughout. Here, the curvilinear encoder system 40" can operate with the mover portion 42 being a "wound mover" in which excitation and/or pick-up coils surround teeth of the mover portion 42. By way of example, a first PCB 70 can provide an excitation coil with respect to the stator 44 by forming windings around teeth of the stator 44 in multiple layers of the first PCB 70. However, a second PCB 72 can provide a first pick-up coil with respect to the mover portion 42 by forming windings around teeth of the mover portion 42 in multiple layers of the second PCB 72. A third PCB 74, disposed over the second PCB 72, can provide a second pick-up coil with respect to the mover portion 42 by forming windings around teeth of the mover portion 42 in multiple layers of the second PCB 72. Accordingly, the stator 44 can still provide an excitation signal to the excitation coil in the first PCB 70 to produce an EM field. The EM field, in turn, can induce first and second pick-up signals in the first and second pick-up coils of the second and third PCB's 72 and 74, respectively, when the mover portion 42 is in proximity to particular locations of the track 12.

Again, windings of the first and second pick-up coils can be offset by 90°, so that the EM field can induce the first and second pick-up signals to be correspondingly offset, so that the first and second pick-up signals can provide sine and cosine measurements, respectively. Alternatively, the first and second pick-up coils can be offset by another phase, such as 120°. Moreover, a controller of the cart 18 can communicate the first and second pick-up signals, and/or the sine and cosine measurements, respectively, to the controller 20 connected to the track 12. With the first and second pick-up signals provided, and the sine and cosine measurements determined, respectively, a position of the mover portion 42 with respect to the stator 44 can be determined. In addition, the first and second pick-up signals can be compared to determine a direction of travel 56 for the mover portion 42 with respect to the stator 44.

Figure 6:
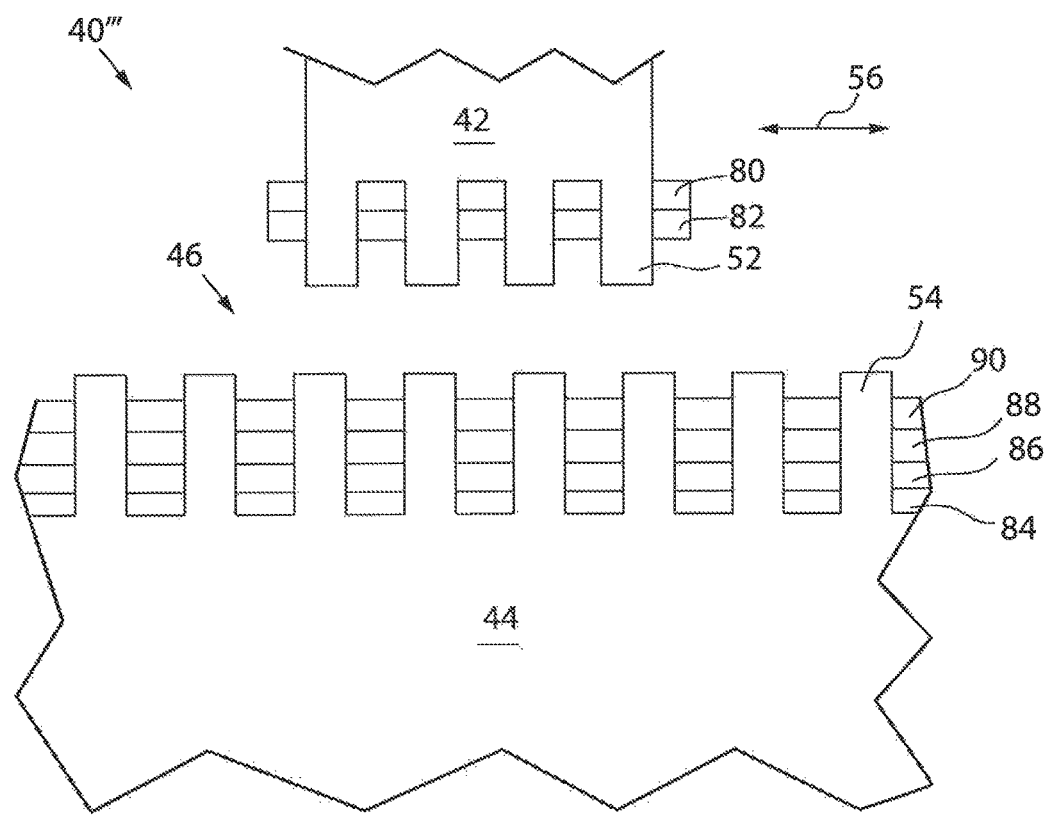
FIG. 6 is a cross sectional view of a stator disposed along the track and a mover portion of the cart according to a fourth aspect, taken along line B-B of FIG. 2.

The aspects of FIGS. 3-5 can be generally referred to as "single-speed" or "incremental" encoder systems providing more than one pole pair. Referring now to FIG. 6, to provide a "multi-speed" or "absolute" encoder system in which a starting position of the mover portion 42 can be determined with respect to the stator 44 upon initially energizing the excitation coils, two resolvers can be implemented side-by-side. Accordingly, a cross sectional view of the mover portion 42 facing the stator 44 across the gap 46, taken along line B-B of FIG. 2, is provided according to a fourth aspect of the invention where like numerals refer to like parts throughout. Here, the curvilinear encoder system 40''' can operate as an absolute encoder system in which multiple excitation coils and multiple pick-up coils are provided. By way of example, a first PCB 80 can provide a first excitation coil ("coarse") with respect to the mover portion 42 by forming windings around teeth of the mover portion 42 in multiple layers of the first PCB 80. In addition, a second PCB 82, disposed over the first PCB 80, can provide a second excitation coil ("fine") with respect to the mover portion 42 by forming windings around teeth of the mover portion 42 in multiple layers of the second PCB 82. Also, a third PCB 84 can provide a first pick-up coil ("coarse_1") with respect to the stator 44 by forming windings around teeth of the stator 44 in multiple layers of the third PCB 84. A fourth PCB 86, disposed over the third PCB 84, can provide a second pick-up coil ("coarse_2") with respect to the stator 44 by forming windings around teeth of the stator 44 in multiple layers of the fourth PCB 86. In addition, a fifth PCB 88, disposed over the fourth PCB 86, can provide a third pick-up coil ("fine_1") with respect to the stator 44 by forming windings around teeth of the stator 44 in multiple layers of the fifth PCB 88. A sixth PCB 90, disposed over the fifth PCB 88, can provide a fourth pick-up ("fine_2") with respect to the stator 44 by forming windings around teeth of the stator 44 in multiple layers of the sixth PCB 90.

Accordingly, multiple excitation signals of differing frequencies (coarse and fine) can be provided, in this case, to the mover portion 42, so that differing EM fields can be produced, such as first and second EM fields produced by excitation coils of the first and second PCB's 80 and 82, respectively. In addition, multiple pick-up coils (coarse_1, coarse_2, fine_1 and fine_2) can be provided, in this case, by the stator 44, so that multiple pick-up signals can be correspondingly induced by the multiple EM fields, such as first and second pick-up signals being induced in pick-up coils of the third and fourth PCB's 84 and 86, respectively, by the first EM field, and third and fourth pick-up signals being induced in pick-up coils of the fifth and sixth PCB's 88 and 90, respectively, by the second EM field, when the mover portion 42 is in proximity to particular locations of the track 12.

Similar to the arrangements of FIGS. 3-5 described above, windings of the first and second pick-up coils can be offset by 90°, so that the first EM field can induce the first and second pick-up signals to be correspondingly offset, so that the first and second pick-up signals can provide a first set of sine and cosine measurements, respectively. In addition, windings of the third and fourth pick-up coils can be offset by 90°, so that the second EM field can induce the third and fourth pick-up signals to be correspondingly offset, so that the third and fourth pick-up signals can provide a second set of sine and cosine measurements, respectively. Alternatively, the first and second pick-up coils, and/or the third and fourth pick-up coils, can be offset by another phase, such as 120°. With the first, second, third and fourth pick-up signals provided, and the first and second sets of sine and cosine measurements determined, respectively, a position of the mover portion 42 with respect to the stator 44 can be determined with even greater accuracy. In addition, the first and second pick-up signals, and/or the third and fourth pick-up signals, can be compared to determine a direction of travel 56 for the mover portion 42 with respect to the stator 44.

In addition, the first and second pick-up coils can be implemented with a first number of magnetic poles (coarse), and the third and fourth pick-up coils can be implemented with a second number of magnetic poles (fine). The second number of magnetic poles can be greater than the first number of magnetic poles. This can advantageously provide an "absolute" position determination in which the curvilinear encoder system 40''' can determine a starting position of the mover portion 42 with respect to the stator 44 upon initially energizing the excitation coils (also referred to herein as a "multi-speed" system).

The coarse and fine excitation signals can be provided with differing frequencies. Also, the coarse and fine pick-up coils can have different numbers of turns per teeth and different coil winding directions. For example, one set of pick-up coils could be for a fine position configured with ten pole pairs as NS-NS-NS-NS-NS-NS-NS-NS-NS-NS (where "N" may refer to a clockwise windings around a tooth, "S" may refer to counter-clockwise winding around a tooth, and one or more "N's" followed by one or more "S's" form one magnetic pole pair between one or more teeth), and the other set of pick-up coils could be for a coarse position configured with two pole pairs as NNNNN-SSSSS-NNNNN-SSSSS (which would be five times coarser than the fine).

Figure 7:
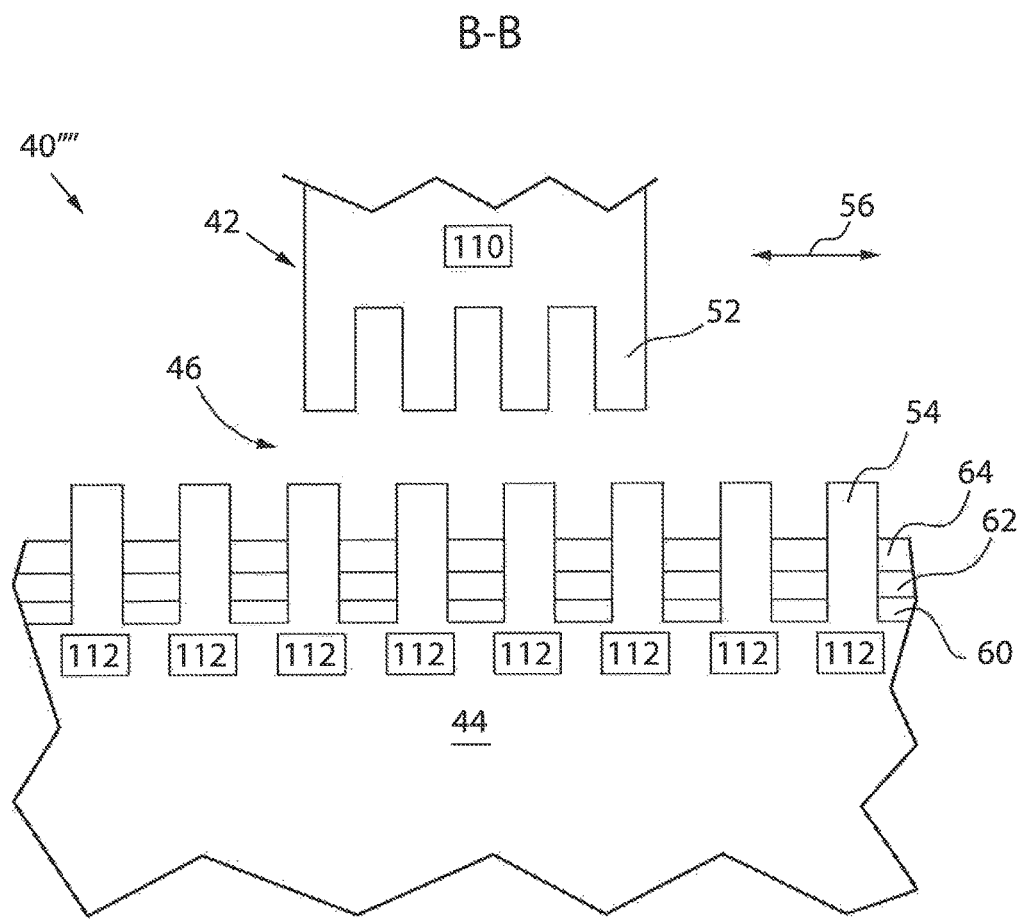
FIG. 7 is a cross sectional view of a stator disposed along the track and a mover portion of the cart according to a fifth aspect, taken along line B-B of FIG. 2.

Referring now to FIG. 7, another "multi-speed" or "absolute" encoder system in which a starting position of the mover portion 42 can be determined with respect to the stator 44 upon initially energizing the excitation coils is provided according to a fifth aspect of the invention. Here, the curvilinear encoder system 40'''' can again operate with the mover portion 42 being a "reluctance mover" in which the excitation and pick-up coils surround teeth of only the stator 44 without any coils surrounding teeth of the mover portion 42, similar to the aspect described above with respect to FIG. 3. However, to provide absolute position determination, the pick-up coils can provide a first sensing, such as "fine" sensing, similar to the aspect described above with respect to FIG. 6, but for a second sensing, such as "coarse" sensing, a magnet 110, such as a permanent magnet, can be provided on the mover portion 42 or the stator 44, and multiple magnetic detection sensors 112, such as Hall effect sensors, can be provided on the stator 44 to or the mover portion 42 to oppose the magnet 110 across the gap 46. The magnetic detection sensors 112 can provide output signals for position determination similar to the pick-up signals. Accordingly, a lesser number of coils can be used for implementing absolute position determination.

It will be appreciated that additional configurations and aspects of the invention can be provided, such as greater or fewer numbers of coils of varying phases and/or magnetic pole configurations, whether for excitation or pick-up, can be provided. Moreover, such configurations and aspects can be provided with respect to the stator 44 and/or the mover portion 42 of one or more of the carts 18. Such variations are deemed within the scope of the invention.

Figure 8:
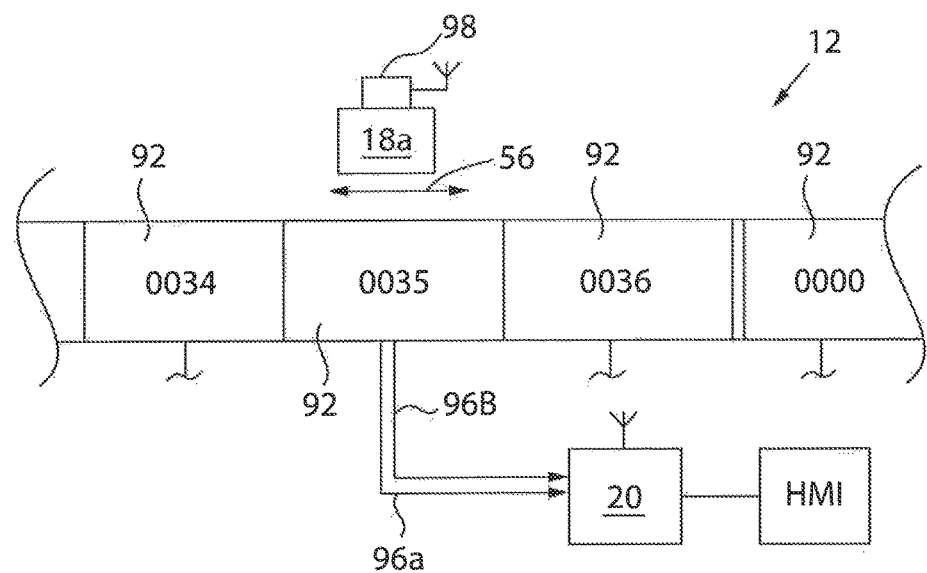
FIG. 8 is an exemplar diagram illustrating a cart moving along a section of the track of FIG. 1 in accordance with an aspect of the invention.

Referring now to FIG. 8, an exemplar diagram illustrating the cart 18a moving along sections 92 of the track 12, is provided in accordance with an aspect of the invention. The sections 92 can be uniquely identifiable to the controller 20 connected to the track 12, such as identification numbers "0034," "0035," "0036" illustrated by way of example. A last section ("0036") can return to a first section ("0000") in the track 12 to form a closed loop. Each section could be, for example, about 400 mm in length, and the track 12 could be, for example, about 15 m in length.

The first and second pick-up coils can be repeated in sections along the track 12, and in each section, the windings of the coils can be repeated to consistently implement the desired number of magnetic poles. In a system targeting higher resolution for position determination, a greater number of magnetic poles can be provided in each section (such as 4 pole pairs). This can advantageously provide higher frequencies for analyzing signals. However, in a system targeting higher accuracy for detection of pick-up signals, a lesser number of magnetic poles can be provided in each section (such as 1 pole pair). This can advantageously provide higher amplitudes for detecting signals. When excitation coils of the system are initially energized, pick-up signals induced in the pick-up coils, such as first and second sets of pick-up signals 96a and 96b, respectively, can be provided by the sections 92 to the controller 20. In instances in which pick-up signals are induced in pick-up coils provided by the cart 18a, a controller 98 of the cart 18a can communicate such pick-up signals to the controller 20, such as via wireless communication. In addition, or alternatively, the sections 92 and/or the controller 98 can communicate measurements or other processing corresponding to the pick-up signals, such as first and second sets of sine and cosine measurements as described above with respect to FIG. 5, which may correspond to the first and second sets of pick-up signals 96a and 96b, respectively. Accordingly, the controller 20 (and/or controller 98) can thereby determine an absolute position of the cart 18a with respect to the track 12 upon start-up. In addition, during operation, the controller 20 (and/or controller 98) can continuously determine and monitor positions of the cart 18a with respect to the track 12 as the cart 18a moves along the direction of travel 56. Moreover, the controller 20 (and/or controller 98) can continuously determine and monitor the direction of travel 56 of the cart 18a.

Figure 9:
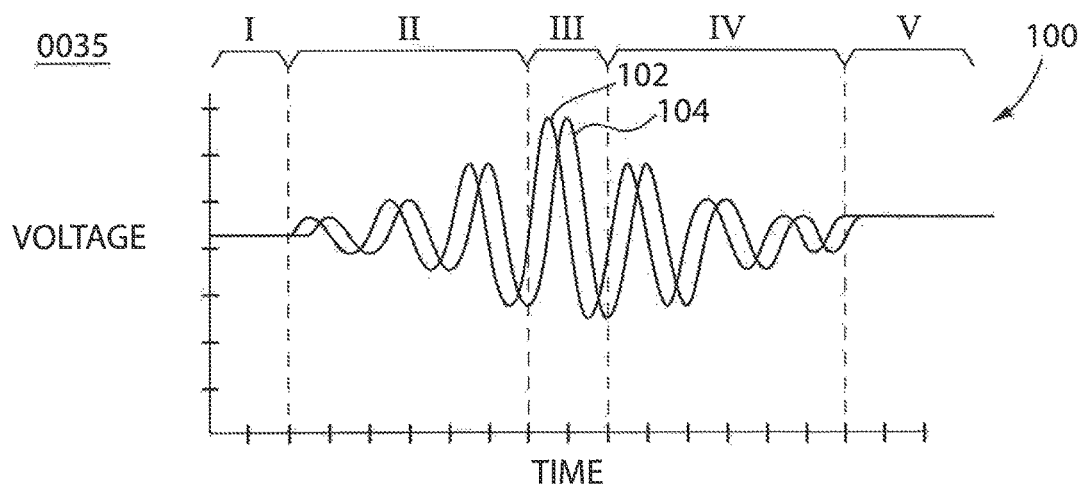
FIG. 9 are exemplar waveforms illustrating first and second pick-up signals forming a set of sine and cosine measurements for determining a position of a mover portion with respect to a stator in accordance with an aspect of the invention.

Referring now to FIG. 9, exemplar waveforms 100 for pick-up signals which can be received at a section 92 and provided to the controller 20, such as the first set of pick-up signals 96a received at the section 0035, are shown by way of example. The first set of pick-up signals 96a can include first and second pick up signals 102 and 104, respectively, which can be provided by two pick-up coils offset from one another by 90°. Accordingly, the first and second pick up signals 102 and 104, respectively can be used to produce sine measurement and cosine measurements for mathematically determining a position of the cart 18a with respect to the track 12. During a first time period "I," when the cart 18a is distal from the section 0035, the pick-up signals may detect no change from a stand-by condition. However, during a second time period "II," when the cart 18a approaches the section 0035, pick-up signals may be detected with increasing amplitude as teeth of the mover portion 42 begin to align with teeth of the stator 44 in the section 0035. In addition, the order/sequence of the first and second pick up signals 102 and 104, respectively, can be used to determine the direction from the cart 18 is approaching. Next, during a third time period "III," when the cart 18a is fully proximal to the section 0035, the pick-up signals may be detected with maximum amplitudes as teeth of the mover portion 42 fully align with teeth of the stator 44 in the section 0035. Next, during a fourth time period "IV," when the cart 18a departs from the section 0035, the pick-up signals may decrease in amplitude as teeth of the mover portion 42 no longer align with teeth of the stator 44 in the section 0035. Finally, during a fifth time period "V," when the cart 18a is again distal from the section 0035, the pick-up signals may detect no change again from the stand-by condition.

Figure 10:
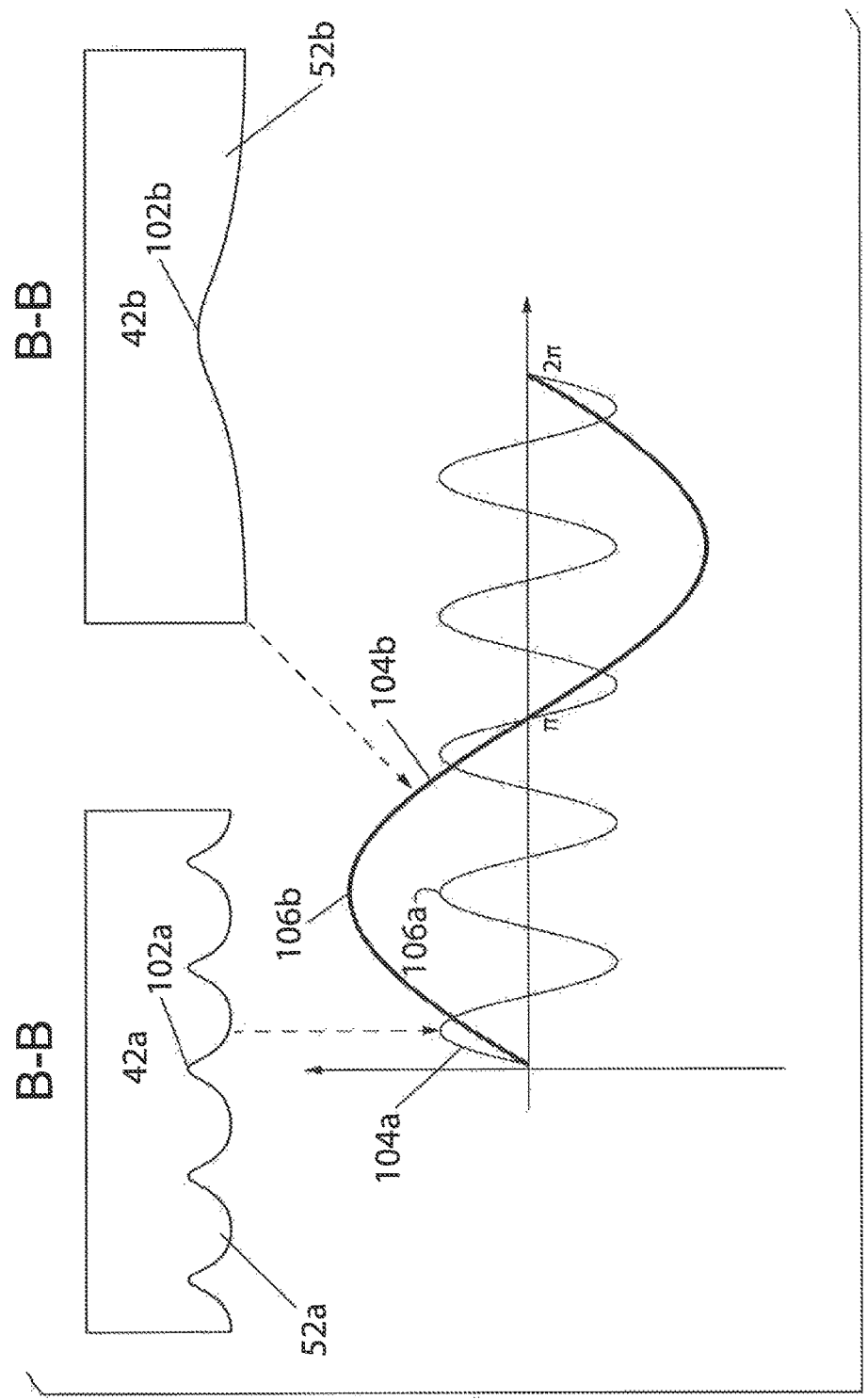
FIG. 10 illustrates cross sectional views of a first mover portion, shaped to provide five magnetic pole pairs, and a second mover portion, shaped to provide one magnetic pole pair, each taken along line B-B of FIG. 2, and exemplar waveforms illustrating pick-up signals from the first and second mover portions.

Referring now to FIG. 10, cross sectional views of a first mover portion 42a, shaped to provide multiple magnetic pole pairs, in this case five, and a second mover portion 42b, shaped to provide one magnetic pole pair, each taken along line B-B of FIG. 2, are provided where like numerals refer to like parts throughout. The first and second mover portions 42a and 42b, respectively, could be different mover portions which could be used on different carts 18. Accordingly, the first and second mover portions 42a and 42b, respectively, could each face the stator 44 across the gap 46. Moreover, the first and second mover portions 42a and 42b, respectively, could each operate as "reluctance movers" in which the excitation and pick-up coils surround teeth of only the stator 44 (not shown in FIG. 10) without any coils surrounding teeth of the mover portion, similar to the aspect described above with respect to FIG. 3.

Teeth 52a of the first mover portion 42a can have a sinusoidal profile similar to the aspect described above with respect to FIG. 4. In particular, by way of example, a profile of the teeth 52a of the first mover portion 42a can include five symmetric peaks 102a, each with fixed heights, surrounded by symmetric valleys, thereby forming five magnetic pole pairs on the first mover portion 42a. Due to this shape, when the first mover portion 42a moves in are EM field (produced in the gap 46 by an excitation coil surrounding teeth of the stator 44), a pick up signal 104a, induced in a pick up coil surrounding teeth of the stator 44, can correspondingly reflect the five symmetric peaks 102a as five symmetric waveform peaks 106a, surrounded by symmetric valleys, per section of track. Such a profile configuration of the teeth 52a, correspondingly producing the peaks 102a and valleys of the profile in the pick up signal 104a, can provide high resolution position determination for the first mover portion 42a in the system 10.

In alternative arrangements, the profile of the first mover portion 42a can have more or less magnetic pole pairs (by implementing more or less peaks/valleys in the profile of the teeth 52a), with more magnetic pole pairs providing even higher resolution, and less magnetic pole pairs providing lower resolution. However, without additional circuitry, the first mover portion 42a may not provide absolute mechanical position determination which is particularly useful for locating the first mover portion 42a during initial power up or start-up of the system 10.

Still referring to FIG. 10, teeth 52b of the second mover portion 42b can also have a sinusoidal profile similar to the aspect described above with respect to FIG. 4. However, unlike the profile of the first mover portion 42a, a profile of the teeth 52b of the second mover portion 42b can include one peak 102b, surrounded by symmetric valleys, thereby forming one magnetic pole pair on the second mover portion 42b. Due to this shape, when the second mover portion 42b moves in the EM field (produced in the gap 46 by an excitation coil surrounding teeth of the stator 44), the pick up signal 104b induced in the pick up coil surrounding teeth of the stator 44 can correspondingly reflect one peak 102b as one waveform peak 106b per section of track. Such a profile configuration of the teeth 52b, correspondingly producing the one peak 102b of the profile in the pick up signal 104b, can provide absolute mechanical position determination useful for locating the first mover portion 42b during initial power up or start-up of the system 10. In other words, the one peak 106b indicates the only possible location in which the first mover portion 42b can be located on the section of track. However, without additional circuitry, the second mover portion 42b does not provide high resolution position determination.

Figure 11:
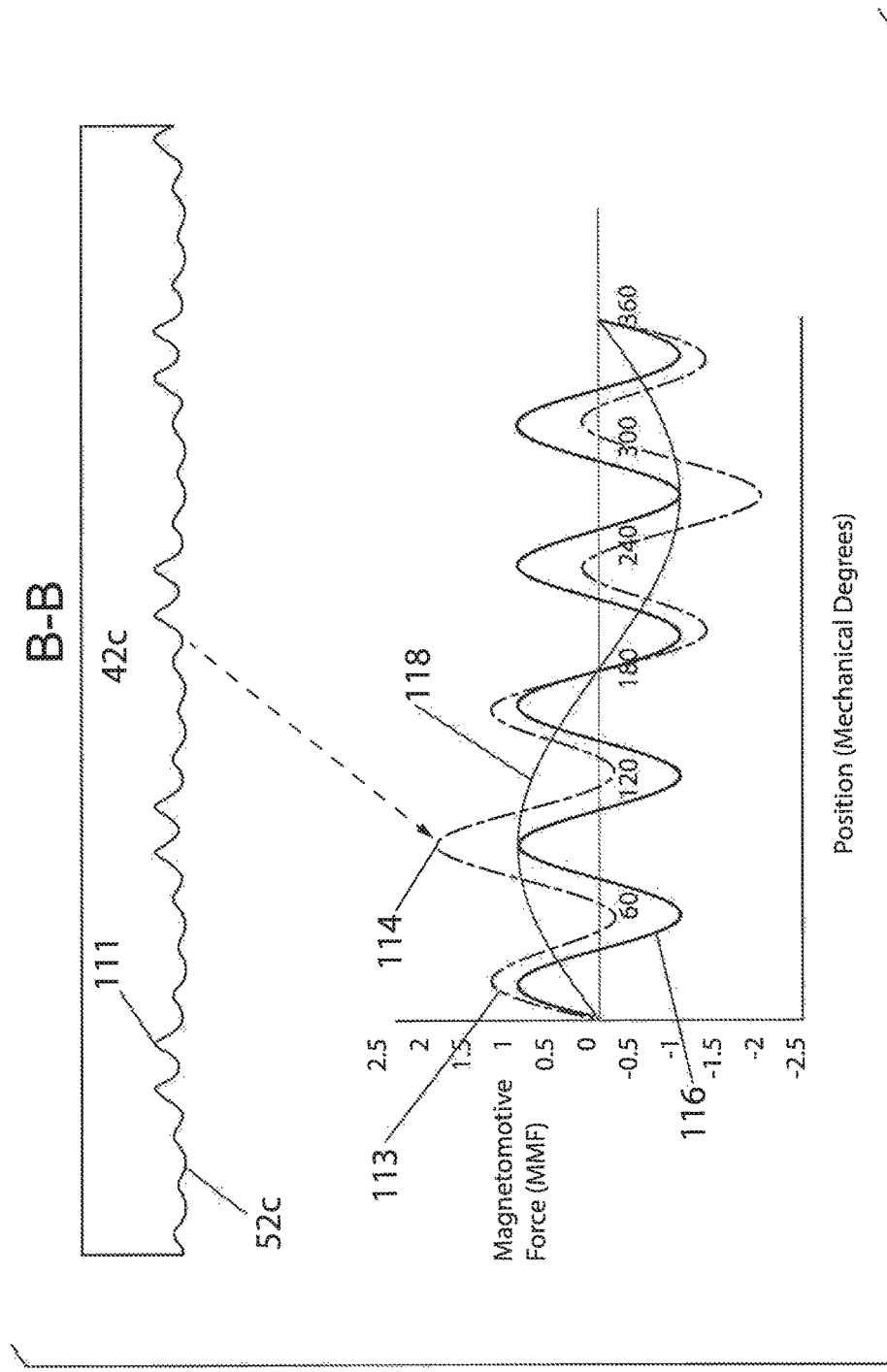
FIG. 11 illustrates a cross sectional view a hybrid mover portion, shaped to provide a curvilinear profile with first and second harmonics, and exemplar waveforms illustrating a pick-up signal from the hybrid mover portion, and the first and second harmonics derived from the pick-up signal, to thereby combine aspects of the first and second mover portions of FIG. 10, in accordance with an aspect of the invention.

Referring now to FIG. 11, a cross sectional view of a hybrid mover portion 42c, shaped to provide a curvilinear profile with first and second harmonics, taken along line B-B of FIG. 2, is provided in accordance with aspect of the invention where like numerals refer to like parts throughout. The hybrid mover portion 42c could be another mover portion which could be used on a cart 18. Accordingly, the hybrid mover portion 42c could face the stator 44 across the gap 46. Moreover, the hybrid mover portion 42c could operate as a "reluctance mover" in which the excitation and pick-up coils surround teeth of only the stator 44 (not shown in FIG. 11) without any coils surrounding teeth of the mover portion, similar to the aspect described above with respect to FIG. 3.

Teeth 52c of the hybrid mover portion 42c can have a curvilinear profile that is a hybrid of the sinusoidal profiles of the first and second mover portions 42a and 42b, respectively, described above with respect to FIG. 10. In particular, by way of example, a profile of the teeth 52c of the hybrid mover portion 42c can include multiple varying peaks 111, which can vary with amplitude of the peaks 111 and/or frequency of the peaks 111, thereby forming multiple varying magnetic pole pairs on the hybrid mover portion 42c. Due to this shape, when the hybrid mover portion 42c moves in the EM field (produced in the gap 46 by an excitation coil surrounding teeth of the stator 44), a pick up signal 113, induced in the pick up coil surrounding teeth of the stator 44, can correspondingly reflect the varying peaks 111 as varying waveform peaks 114, surrounded by valleys, per section of track. Such a profile configuration of the teeth 52c, correspondingly producing the varying peaks 111 and valleys of the profile in the pick up signal 113, can cause multiple harmonics in the signal corresponding to harmonics in the shape of the curvilinear teeth 52c. In particular, the profile configuration of the teeth 52c can correspondingly produce first and second harmonics 116 and 118, respectively, caused by corresponding first and second harmonics of the curvilinear profile of the teeth 52c of the mover portion in the EM field. The first harmonic 116 can provide a fine position of the hybrid mover portion 42c with respect to the stator 44 for high resolution position determination, like the pick up signal 104a (detecting the first mover portion 42a). The second harmonic 118 can provide a coarse position of the hybrid mover portion 42c with respect to the stator 44 for absolute mechanical position determination, like the pick up signal 104b (detecting the second mover portion 42b).

The controller 20, receiving the pick up signal, such as by way of the first set of pick-up signals 96a, could execute a fast Fourier transform (PET) of the pick-up signal to derive the first and second harmonics. Moreover, with the first and second harmonics present in the first set of pick-up signals 96a, a second set of pick-up signals 96b is unnecessary, and additional pick-up coils used for the second set of pick-up signals 96b can be deleted thereby reducing complexity and cost in the system 10.

The curvilinear profile of the teeth 52c can be shaped to cause the gap 46 between the hybrid mover portion 42c and the stator 44 to be defined by a trigonometric function. For example, a gap length ("$\delta$") of the gap 46 between the stator 44 (on the track 12) and the hybrid mover portion 42c can meet the following equation, where $\delta_{min}$ is a minimum air gap length; "$P_{p1}$" and "$P_{p2}$" are two working pole pairs, "$A_1$" is a magnitude for a harmonic with pole pair "$P_{p1}$"; "$\theta$" is a mechanical angle; and "K" is a coefficient for a harmonic with pole pair "$P_{p2}$":

$$\delta = \frac{K\delta_{min}}{1 + (K-1)\cos(P_{p2}\theta) - A_1\cos(P_{p1}\theta)}$$

Figure 12:
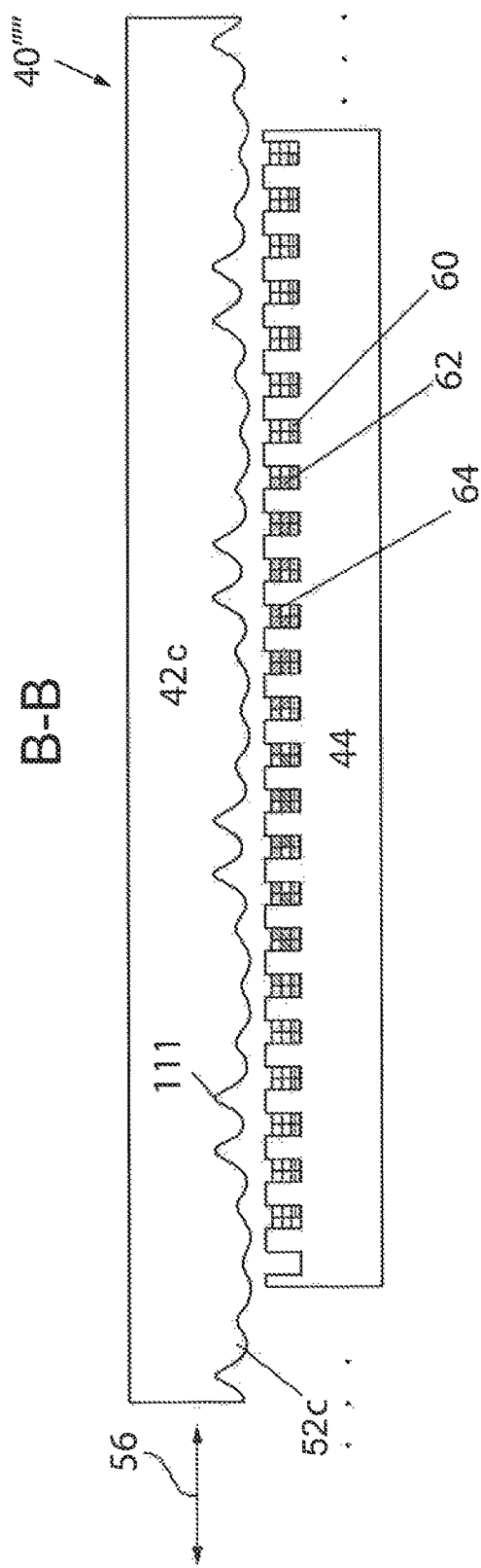
FIG. 12 is a cross sectional view of a stator disposed along the track and a hybrid mover portion of the cart of FIG. 11, taken along line B-B of FIG. 2.

Referring now to FIG. 12, a cross sectional view of the hybrid mover portion 42c facing the stator 44 across the gap 46 (only one section of the track 12 with the stator 44 is shown for ease of understanding), taken along line B-B of FIG. 2, is provided in accordance with an aspect of the invention where like numerals refer to like parts throughout. Here, the curvilinear encoder system 40'''' can operate with the hybrid mover portion 42c being a "reluctance mover" in which the excitation and pick-up coils surround teeth of only the stator 44 without any coils surrounding teeth of the hybrid mover portion 42c similar to the aspect described above with respect to FIG. 3. However, teeth 52c of the mover portion 42c can have a sinusoidal profile for improved EM properties with minimized distortion. Accordingly, the teeth 52c can have shaped poles which can be operable to reduce pick-up signal harmonics. Movement of the hybrid mover portion 42c in the EM field produced by an excitation coil in the first PCB 60 can cause pick-up signals with multiple harmonics (caused by the multiple harmonics of the curvilinear profile of the teeth 52c) to be produced in the first pick-up coil in the second PCB 62 (which could be used to provide a sine measurement) and the second pick-up coil in the third PCB 64 (which could be used to provide a cosine measurement). The pick-up signals, in turn, can be received by the controller 20 for determining the fine (non-absolute mechanical position track with higher resolution) and coarse (absolute mechanical position with lower resolutions) positions of the hybrid mover portion 42c with respect to the particular section of the track 12.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

What is claimed is:

1. An industrial control system for moving objects, comprising:
    a track having curved and linear sections;
    a stator disposed along the track, the stator having a plurality of teeth;
    a cart for moving objects along the track, the cart having a mover portion having a plurality of teeth, wherein the teeth of the mover portion are arranged to face the teeth of the stator across a gap, and wherein the teeth of the mover portion have a curvilinear profile with first and second harmonics;
    an excitation coil surrounding teeth of the stator, wherein an excitation signal provided to the excitation coil is operable to produce an electromagnetic (EM) field; and
    a pick-up coil surrounding teeth of the stator, wherein presence of the cart in the EM field induces a pick-up signal in the pick-up coil with first and second harmonics caused by the first and second harmonics of the curvilinear profile of the teeth of the mover portion in the EM field for determining a fine position of the mover portion with respect to the stator from the first harmonic and a coarse position of the mover portion with respect to the stator from the second harmonic.

2. The system of claim 1, wherein the first and second harmonics of the curvilinear profile of the teeth of the mover portion provide magnetic pole pairs in the EM field.

3. The system of claim 2, wherein the first harmonic of the curvilinear profile of the teeth of the mover portion provides at least five magnetic pole pairs for inducing the second harmonic in the pick-up signal being at least a fifth order harmonic and the second harmonic of the curvilinear profile of the teeth of the mover portion provides one magnetic pole pair for inducing the first harmonic in the pick-up signal being a first order harmonic.

4. The system of claim 1, wherein the coarse position provides an absolute mechanical position of the mover portion with respect to the stator in a section of the track with lower resolution and the fine position provides a non-absolute mechanical position of the mover portion with respect to the stator in the section of the track with higher resolution.

5. The system of claim 1, further comprising a controller receiving the pick-up signal, wherein the controller executes a fast Fourier transform (FFT) of the pick-up signal to derive the first and second harmonics.

6. The system of claim 1, wherein the teeth of the stator have a rectangular profile.

7. The system of claim 1, wherein the pick-up coil is a first pick-up coil and the pick-up signal is a first pick-up signal, and further comprising a second pick-up coil surrounding teeth of the stator, wherein the EM field induces a second pick-up signal in the second pick-up coil with the first and second harmonics for determining the coarse and fine positions.

8. The system of claim 7, wherein the first and second pick-up signals provide sine and cosine measurements, respectively.

9. The system of claim 1, further comprising a plurality of controllers, wherein each section of the track provides an output to a controller for determining the coarse and fine positions and a direction of the mover portion with respect to the stator in a section of the track.

10. The system of claim 1, wherein the gap is defined by a trigonometric function.

11. A method for moving objects in an industrial control system, comprising:
    providing a track having curved and linear sections;
    providing a stator along the track, the stator having a plurality of teeth;
    providing a cart for moving objects along the track, the cart having a mover portion having a plurality of teeth, wherein the teeth of the mover portion are arranged to face the teeth of the stator across a gap, and wherein the teeth of the mover portion have a curvilinear profile with first and second harmonics;
    providing an excitation signal to an excitation coil surrounding teeth of the stator to produce an electromagnetic (EM) field;
    detecting a pick-up signal in a pick-up coil surrounding teeth of the stator, wherein presence of the cart in the EM field induces first and second harmonics in the pick-up signal caused by the first and second harmonics of the curvilinear profile of the teeth of the mover portion in the EM field; and
    determining a fine position of the mover portion with respect to the stator from the first harmonic and a coarse position of the mover portion with respect to the stator from the second harmonic.

12. The method of claim 11, wherein the first and second harmonics of the curvilinear profile of the teeth of the mover portion provide magnetic pole pairs in the EM field.

13. The method of claim 12, wherein the first harmonic of the curvilinear profile of the teeth of the mover portion provides at least five magnetic pole pairs for inducing the second harmonic in the pick-up signal being at least a fifth order harmonic and the second harmonic of the curvilinear profile of the teeth of the mover portion provides one magnetic pole pair for inducing the first harmonic in the pick-up signal being a first order harmonic.

14. The method of claim 11, wherein the coarse position provides an absolute mechanical position of the mover portion with respect to the stator in a section of the track with lower resolution and the fine position provides a non-absolute mechanical position of the mover portion with respect to the stator in the section of the track with higher resolution.

15. The method of claim 11, further comprising executing a fast Fourier transform (FFT) of the pick-up signal to derive the first and second harmonics.

16. The method of claim 11, wherein the teeth of the stator have a rectangular profile.

17. The method of claim 11, wherein the pick-up coil is a first pick-up coil and the pick-up signal is a first pick-up signal, and further comprising detecting a second pick-up signal in a second pick-up coil surrounding teeth of the stator, wherein presence of the cart in the EM field induces the second pick-up signal in the second pick-up coil with the first and second harmonics for determining the coarse and fine positions.

18. The method of claim 17, wherein the first and second pick-up signals provide sine and cosine measurements, respectively.

19. The method of claim 11, further comprising determining the coarse and fine positions and a direction of the mover portion with respect to the stator in a section of the track.

20. The method of claim 11, wherein the gap is defined by a trigonometric function.

* * * * *